United States Patent
Tsubaki et al.

(10) Patent No.: US 10,513,290 B2
(45) Date of Patent: Dec. 24, 2019

(54) ELECTRIC POWER STEERING APPARATUS

(71) Applicant: NSK LTD., Tokyo (JP)

(72) Inventors: Takahiro Tsubaki, Maebashi (JP);
Tomohiro Miura, Maebashi (JP);
Takashi Sunaga, Tokyo (JP); Nobuaki Kogure, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/070,973

(22) PCT Filed: Jul. 4, 2017

(86) PCT No.: PCT/JP2017/024491
§ 371 (c)(1),
(2) Date: Jul. 18, 2018

(87) PCT Pub. No.: WO2018/008633
PCT Pub. Date: Jan. 11, 2018

(65) Prior Publication Data
US 2019/0337560 A1 Nov. 7, 2019

(30) Foreign Application Priority Data

Jul. 6, 2016 (JP) .............................. 2016-134423
Jul. 6, 2016 (JP) .............................. 2016-134424

(51) Int. Cl.
*B62D 5/04* (2006.01)
*H02P 29/64* (2016.01)

(52) U.S. Cl.
CPC ........... *B62D 5/0496* (2013.01); *B62D 5/046* (2013.01); *H02P 29/64* (2016.02)

(58) Field of Classification Search
CPC ...................................................... H02P 29/64
(Continued)

(56) References Cited

U.S. PATENT DOCUMENTS 6,854,881 B2 * 2/2005 Nada ..................... B60K 6/445
324/500

FOREIGN PATENT DOCUMENTS

JP 2003-134869 A 5/2003
JP 2009-089531 A 4/2009
(Continued)

OTHER PUBLICATIONS

International Search Report for PCT/JP2017/024491, dated Oct. 10, 2017.

*Primary Examiner* — David Luo
(74) *Attorney, Agent, or Firm* — Sughrue Mion, PLLC

(57) ABSTRACT

An electric power steering apparatus that enables more precise estimation of a coil temperature by considering a heat transfer phenomenon between a control substrate and a poly-phase coil in addition to a heat transfer phenomenon between respective phases of the coil. The apparatus includes a control substrate that controls a poly-phase motor, a temperature sensor that detects a substrate temperature of the control substrate and a coil temperature estimating section that estimates coil temperatures of respective phases of the poly-phase motor by a motor current of the phase and the substrate temperature based on a heat transfer phenomenon between the respective phases that is caused by a difference in temperature between coils of the respective phases and a heat transfer phenomenon between the coil and the control substrate.

14 Claims, 10 Drawing Sheets

(58) Field of Classification Search
USPC .................. 318/400.08, 400.04, 400.01, 700
See application file for complete search history.

(56) References Cited

FOREIGN PATENT DOCUMENTS

| | | |
|---|---|---|
| JP | 4483298 B2 | 6/2010 |
| JP | 5211618 B2 | 6/2013 |

* cited by examiner

PRIOR ART

PRIOR ART

ELECTRIC POWER STEERING APPARATUS

This Application is a National Stage of International Application No. PCT/JP2017/024491 filed Jul. 4, 2017, claiming priority based on Japanese Patent Application No. 2016-134423 filed Jul. 6, 2016 and 2016-134424 filed Jul. 6, 2016.

TECHNICAL FIELD

The present invention relates to an electric power steering apparatus that has a function to estimate a coil temperature of a poly-phase motor, and in particular to an electric power steering apparatus that is capable of estimating a coil temperature considering a heat transfer phenomenon between respective phases which is caused by a difference in temperature between coils of the respective phases and a heat transfer phenomenon between the coil and a control substrate.

BACKGROUND ART

An electric power steering apparatus (EPS) which provides a steering system of a vehicle with a steering assist torque (an assist torque) by means of a rotational torque of a motor, applies a motor driving force as the steering assist torque to a steering shaft or a rack shaft by means of a transmission mechanism such as gears or a belt through a reduction mechanism, and performs assist control. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft, a handle shaft) 2 connected to a steering wheel 1 is connected to steered wheels 8L and 8R through reduction gears (worm gears) 3 constituting the reduction mechanism, universal joints 4a and 4b, a rack and pinion mechanism 5, tie rods 6a and 6b, further via hub units 7a and 7b. In addition, a torsion bar is interposed in the column shaft 2, the column shaft 2 is provided with a steering angle sensor 14 for detecting a steering angel θ of the steering wheel 1 in accordance with a twist angle of the torsion bar and a torque sensor 10 for detecting a steering torque Th, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist control command based on the steering torque Th detected by the torque sensor 10 and a vehicle speed Vel detected by a vehicle speed sensor 12, and controls a current supplied to the motor 20 based on a voltage control command value Vref obtained by performing compensation and so on with respect to the current command value.

Further, the steering angle sensor 14 is not indispensable and may not be provided, and it is possible to obtain the steering angle from a rotational angle sensor such as a resolver connected to the motor 20.

A controller area network (CAN) 40 to exchange various information of a vehicle is connected to the control unit 30, and it is also possible to receive the vehicle speed Vel from the CAN 40. Further, it is also possible to connect a non-CAN 41 exchanging a communication, analog/digital signals, a radio wave or the like except with the CAN 40 to the control unit 30.

The control unit 30 mainly comprises a CPU (including an MPU, an MCU and so on), and general functions performed by programs within the CPU are shown in FIG. 2.

The control unit 30 will be described with reference to FIG. 2. As shown in FIG. 2, the steering torque Th detected by the torque sensor 10 and the vehicle speed Vel detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 based on the steering torque Th and the vehicle speed Vel that have been inputted and by means of an assist map or the like. The current command value Iref1 is inputted into a current limiting section 33 through an adding section 32A. A current command value Irefm the maximum current of which is limited is inputted into a subtracting section 32B, and a deviation I (=Irefm−Im) between the current command value Irefm and a motor current value Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed back to the subtracting section 32B. The inverter 37 is comprised of a bridge circuit of field effect transistors (FETs) as semiconductor switching elements.

A rotational angle sensor 21 such as a resolver is connected to the motor 20, and a rotational angle θ is detected and outputted by the rotational angle sensor 21.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 at an adding section 344, further adds the result of addition performed at the adding section 344 with a convergence 341 at an adding section 345, and then outputs the result of addition performed at the adding section 345 as the compensation signal CM.

In the case that the motor 20 is a three-phase brushless motor, details of the PWM-control section 36 and the inverter 37 have a configuration as shown in FIG. 3, and the PWM-control section 36 comprises a duty calculating section 36A that calculates PWM duty values D1 to D6 for three phases by using the voltage control command value Vref in accordance with a predetermined expression, and a gate driving section 36B that drives the gates of the FETs serving as driving elements by means of the PWM duty values D1 to D6 and turns the gates on or off with compensating a dead time. The inverter 37 is configured to three-phase bridges of FETs (FET1 to FET6) serving as semiconductor switching elements, and drives the motor 20 by the three-phase bridges of the FETs being made turned on or off by means of the PWM duty values D1 to D6. A motor relay 39 for supplying (ON) or interrupting (OFF) electric power is connected to a power supply line between the inverter 37 and the motor 20 by the phase.

In such an electric power steering apparatus, a large current can flow in a motor in accordance with a steering situation (for example, a case where a steering wheel keeps hitting an end and being locked for a long time in a static steering state). When a coil in the motor has a high temperature, for example, more than or equal to 180 degrees Celsius, a problem of damage of the coil or the like occurs. Therefore, it is necessary to take measures not to overheat the coil from the viewpoint of safety of a vehicle, and to do so, it is necessary to estimate or measure a temperature of the coil (a coil temperature). However, since it is difficult to measure the coil temperature directly, methods to estimate the coil temperature have been proposed.

For example, the publication of Japanese Patent No. 5211618 B2 (Patent Document 1) constructs a temperature estimation model considering a relationship between heat transfer phenomena between poly-phase coils and a motor rotational velocity, and a relationship between a radiation coefficient and the motor rotational velocity, and estimates the coil temperature. Specifically, Patent Document 1 identifies heat transfer coefficients between a coil of any phase in a poly-phase motor and outside air environment and between any phase and another phase in accordance with a change of the motor rotational velocity, and estimates a temperature of a coil of each phase or a magnet in the motor by using a substrate temperature and a current (or a current command value) of each phase. The publication of Japanese Patent No. 4483298 B2 (Patent Document 2) estimates a temperature of a motor coil by utilizing that a calorific value of a motor is proportional to an integrated value of a square value of a current passing through the motor coil and that a temperature change of the motor coil affected by radiation (refrigeration) of the motor coil has a relationship of a primary delay function in a practically applicable temperature range (−40 to 180 degrees Celsius). Specifically, Patent Document 2 estimates the temperature of the motor coil by averaging a value obtained by squaring and integrating a value of the current passing through the motor coil, and making the result pass the primary delay function twice.

THE LIST OF PRIOR ART DOCUMENTS

Patent Documents

Patent Document 1: Japanese Patent No. 5211618 B2
Patent Document 2: Japanese Patent No. 4483298 B2

SUMMARY OF THE INVENTION

Problems to be Solved by the Invention

However, though Patent Document 1 uses a temperature of an ECU as input data considering a heat transfer between respective phase coils, it does not consider a heat transfer between each phase coil and the ECU, so that there is a possibility that an error occurs in an estimated temperature by an influence from the ECU. Since Patent Document 2 does not especially consider the influence from the ECU, there is the possibility that the error occurs in the estimated temperature by the influence from the ECU more than an apparatus in Patent Document 1.

The present invention has been developed in view of the above-described circumstances, and an object of the present invention is to provide an electric power steering apparatus that enables more precise estimation of a coil temperature by considering a heat transfer phenomenon between a control substrate and a poly-phase coil in addition to a heat transfer phenomenon between respective phases of the coil.

Means for Solving the Problems

The present invention relates to an electric power steering apparatus that comprises a control substrate that controls a poly-phase motor, the above-described object of the present invention is achieved by that comprising: a temperature sensor that detects a substrate temperature of the control substrate; and a coil temperature estimating section that estimates coil temperatures of respective phases of the poly-phase motor by a motor current of the phase and the substrate temperature based on a heat transfer phenomenon between the respective phases that is caused by a difference in temperature between coils of the respective phases and a heat transfer phenomenon between the coil and the control substrate.

The above-described object of the present invention is more effectively achieved by that wherein the heat transfer phenomenon is expressed by a frequency characteristic; or wherein the coil temperature estimating section comprises: a coil calorific value calculating section that obtains a coil calorific value of the phase by the motor current, a substrate calorific value calculating section that obtains a substrate calorific value of the control substrate by the motor current, and a coil temperature calculating section that obtains the coil temperature by the coil calorific value, the substrate calorific value and the substrate temperature based on the frequency characteristic; or wherein the coil calorific value calculating section changes a coil resistance of the phase used to obtain the coil calorific value, depending on the coil temperature of a corresponding phase, and wherein the substrate calorific value calculating section changes a substrate resistance used to obtain the substrate calorific value, depending on the substrate temperature; or wherein the frequency characteristic includes a calorific value frequency characteristic that is a frequency characteristic from the coil calorific value or the substrate calorific value to the coil temperature or the substrate temperature, and an outside air temperature frequency characteristic that is a frequency characteristic from an outside air temperature to the coil temperature or the substrate temperature; or wherein the coil temperature calculating section defines the calorific value frequency characteristic and the outside air temperature frequency characteristic as a transfer function, and obtains the coil temperature by a linear combination of the coil calorific value, the substrate calorific value and the substrate temperature; or wherein the heat transfer phenomenon is expressed by a differential equation; or wherein the coil temperature estimating section comprises: a coil calorific value calculating section that obtains a coil calorific value of the phase by the motor current, a substrate calorific value calculating section that obtains a substrate calorific value of the control substrate by the motor current, and a coil temperature calculating section that obtains the coil temperature by the coil calorific value, the substrate calorific value and the substrate temperature based on the differential equation; or wherein the coil calorific value calculating section changes a coil resistance of the phase used to obtain the coil calorific value, depending on the coil temperature of a corresponding phase, and wherein the substrate calorific value calculating section changes a substrate resistance used to obtain the substrate calorific value, depending on the substrate temperature; or wherein the differential equation includes difference information between the coil temperature and the substrate temperature.

Effects of the Invention

Since estimating the coil temperatures of respective phases by using the relational expression that is obtained by considering the heat transfer phenomenon between the coil and the control substrate in addition to the heat transfer phenomenon between the respective phases which is caused by the difference in temperature between the coils of the respective phases, the electric power steering apparatus according to the present invention enables more precise estimation of the temperature.

BRIEF DESCRIPTION OF THE DRAWINGS

In the accompanying drawings.

MODE FOR CARRYING OUT THE INVENTION

The present invention estimates temperatures of coils (coil temperatures) in respective phases (a U-phase, a V-phase and a W-phase) of a poly-phase motor on the basis of a heat transfer phenomenon (a heat conduction, a heat radiation, a heat convection, and so on) between respective phases and a heat transfer phenomenon between each coil and a substrate (a control substrate) of a control unit (ECU). In the poly-phase motor, a difference in calorific values of respective coils occurs by such as dispersion of currents (motor currents) passing through the coils in respective phases, and that causes a difference in temperature between respective coils. This difference in temperature causes heat transfer phenomena between respective phases and between each coil and outside air environment, while a difference in temperature occurs also between the control substrate and each coil. Since the control substrate and the motor are generally close, heat transfer phenomena also occur between the control substrate and each coil and between the control substrate and the outside air environment. The present invention estimates the coil temperature using a motor current and a temperature of the control substrate (a substrate temperature), for example, by expressing those heat transfer phenomena by a frequency characteristic, formulating a relationship between the calorific value and the coil temperature, and obtaining the calorific value from the motor current, or by expressing those heat transfer phenomena by a differential equation, and including difference information between the coil temperature and the substrate temperature in the differential equation.

Hereinafter, an embodiment of the present invention will be described with reference to the accompanying drawings.

Figure 1:
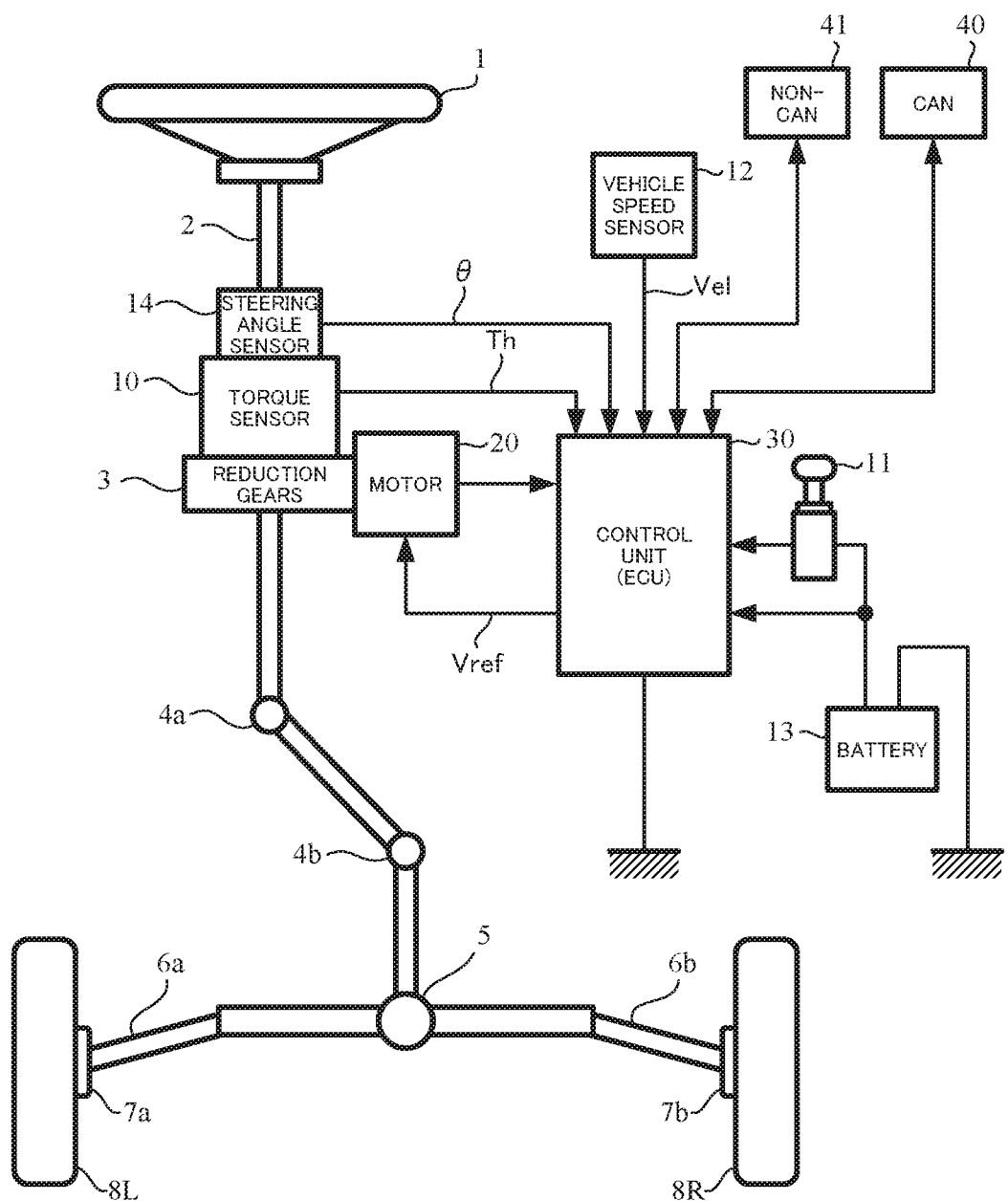
FIG. 1 is a configuration diagram illustrating a general outline of an electric power steering apparatus.
Figure 2:
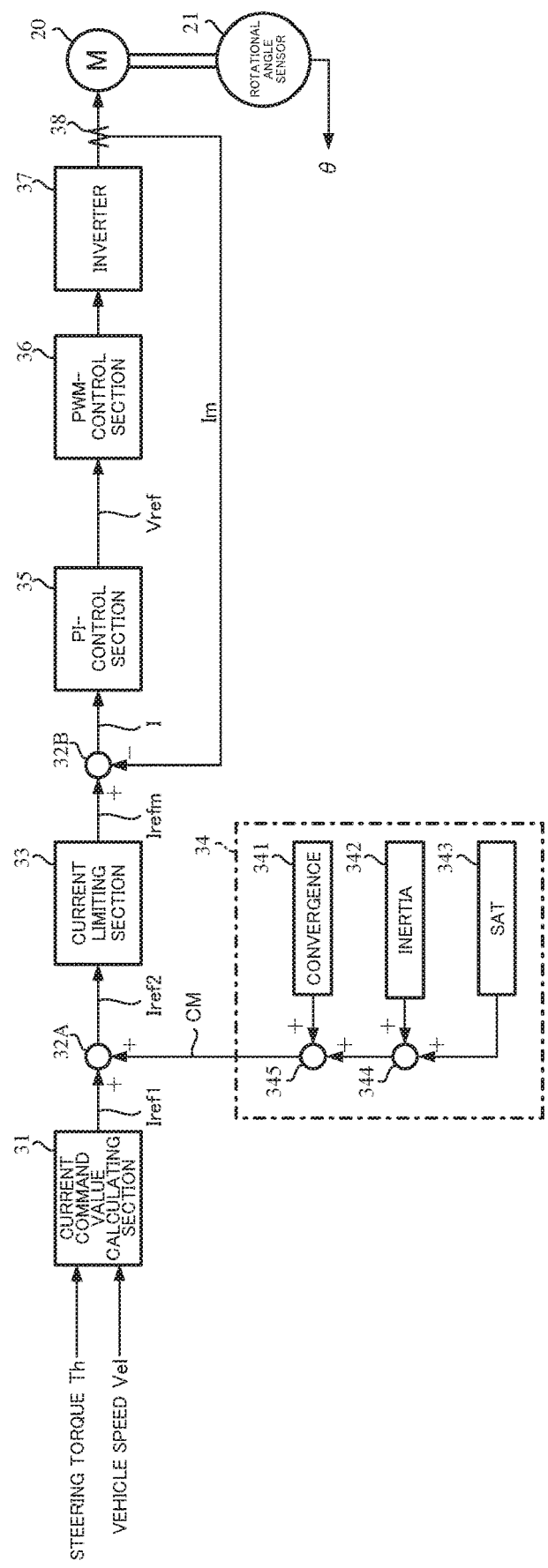
FIG. 2 is a block diagram showing a configuration example of a control unit (ECU) of the electric power steering apparatus.
Figure 3:
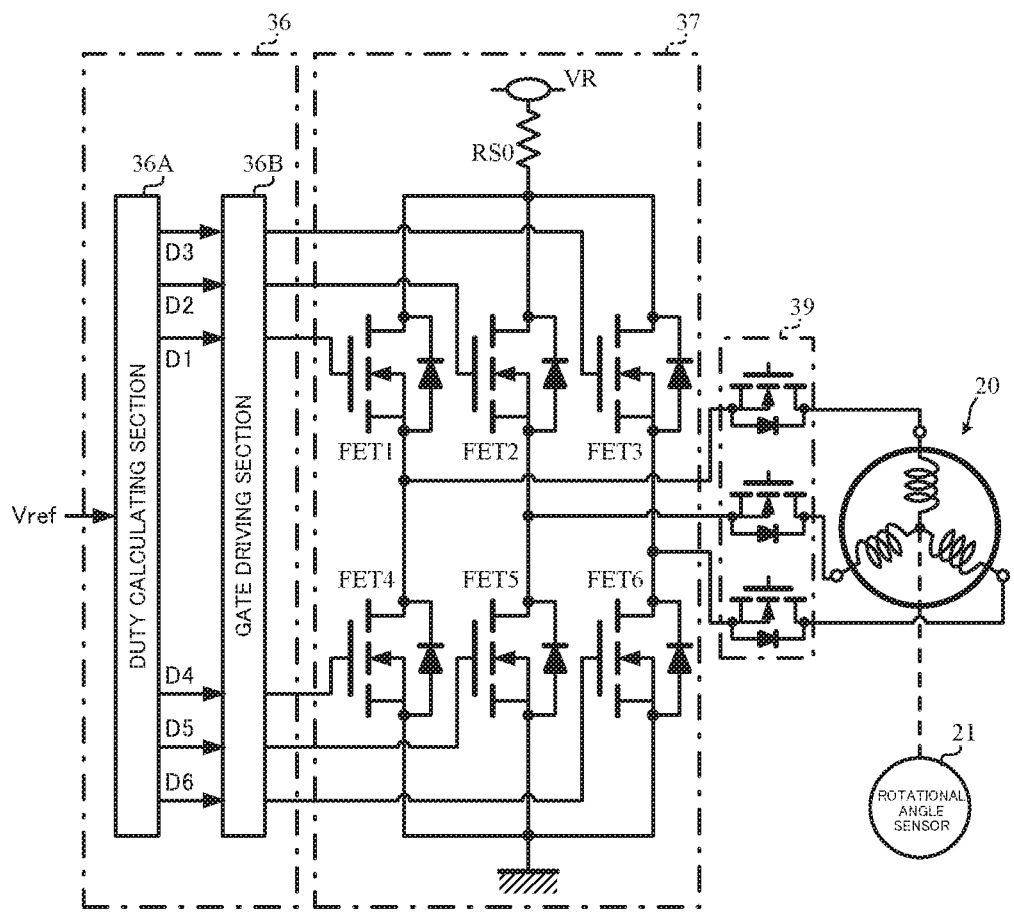
FIG. 3 is a diagram showing a configuration example of a motor control section of the electric power steering apparatus.
Figure 4:
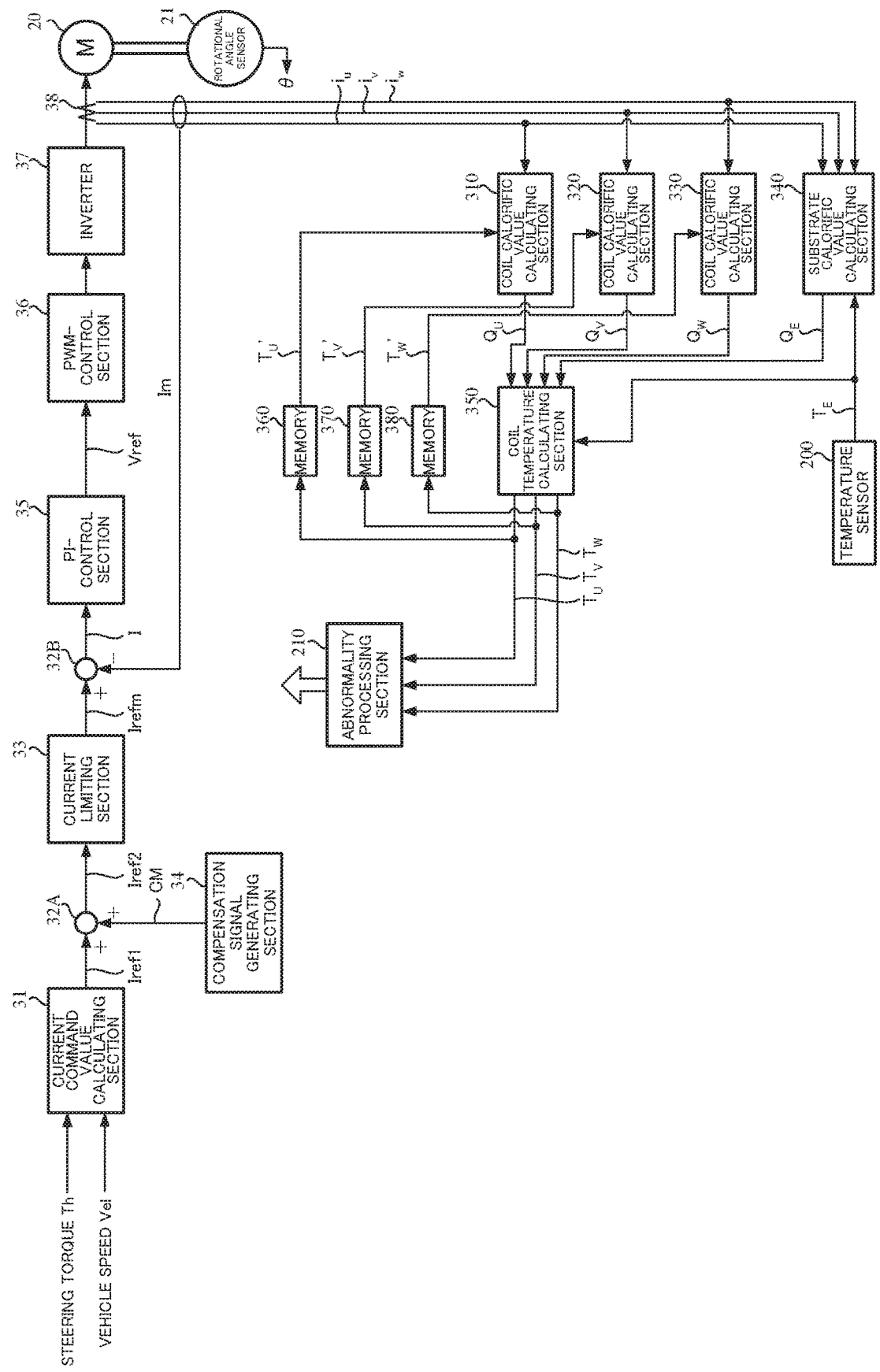
FIG. 4 is a block diagram showing a configuration example (a first embodiment) of the present invention.

FIG. 4 shows a configuration example (a first embodiment) of the embodiment of the present invention corresponding to FIG. 2, the same configurations are designated with the same numerals, and the explanation is omitted.

Figure 5:
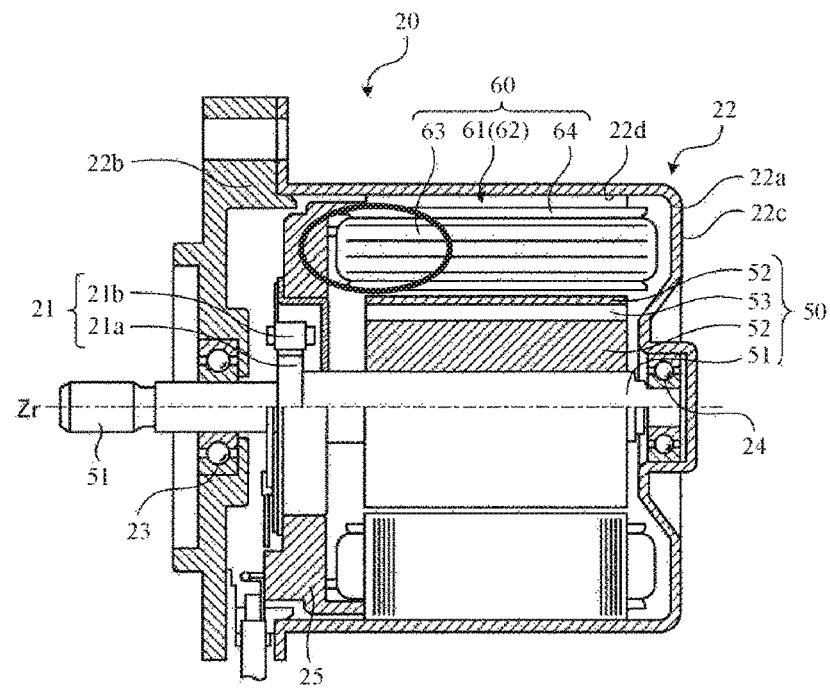
FIG. 5 is a sectional view which schematically shows a side obtained by cutting a configuration of the motor with a virtual plane including a central axis.

An electric power steering apparatus of the present embodiment drives and controls a three-phase (the U-phase, the V-phase and the W-phase) brushless motor, and an object for estimation of the coil temperature is a coil shown by the circle in FIG. 5. FIG. 5 is a sectional view which schematically shows a side obtained by cutting a configuration of a motor 20 with a virtual plane including a central axis Zr. The motor 20 comprises a rotational angle sensor (a resolver) 21, a housing 22, bearings 23 and 24, a rotor 50, and a stator 60. The resolver 21 comprises a resolver rotor 21a and a resolver stator 21b, and is supported by a terminal block 25. The housing 22 includes a cylindrical housing 22a and a front bracket 22b, and a bottom part 22c is formed at an opposite end to the front bracket 22b in the cylindrical housing 22a so as to block the end. The bearing 23 rotatably supports one end of a shaft 51 which is a part of the rotor 50 located inside the cylindrical housing 22a, the bearing 24 rotatably supports the other end of the shaft 51, and thus the shaft 51 rotates around the central axis Zr. The rotor 50 includes the shaft 51, a rotor yoke 52 and a magnet 53. The stator 60 includes a cylindrical stator core 61 and a coil (an exciting coil) 63, and the exciting coil 63 is wound onto the stator core 61. The stator core 61 includes a plurality of split cores 62, and the exciting coil 63 is concentratedly wound outside teeth (not shown) of the split cores 62 through an insulator (a member to insulate the split cores 62 from the exciting coil 63). As described above, a temperature of the coil shown by the circle in the exciting coil 63 is estimated.

Figure 6:
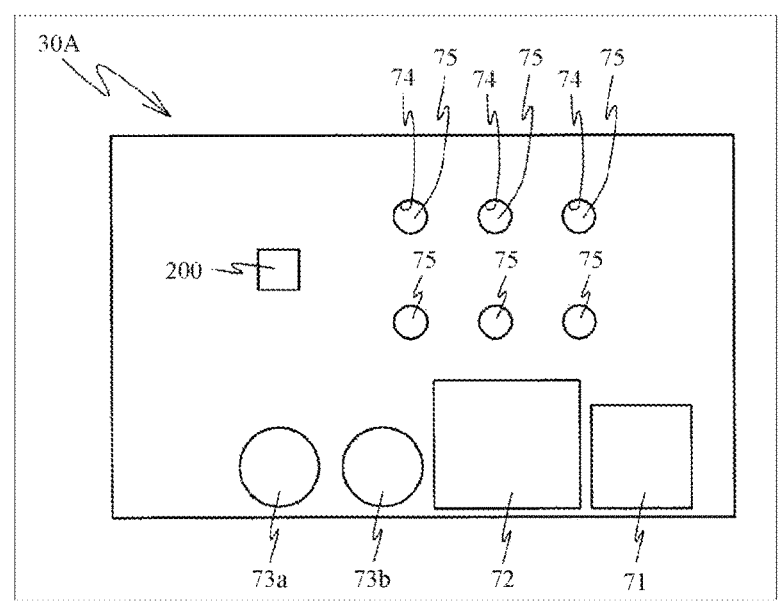
FIG. 6 is a bottom view of a power circuit substrate.

In FIG. 4, a temperature sensor 200 detects a temperature of the control substrate, and outputs it as a substrate temperature $T_E$. For example, a thermistor is used as the temperature sensor 200. An ECU 30 comprises a power circuit substrate and a control circuit substrate that are arranged at a predetermined interval in parallel each other as the control substrate. FIG. 6 shows a bottom side of a power circuit substrate 30A. The temperature sensor (the thermistor) 200 detects a temperature of three-phase bridges of FETs (FET1 to FET6) mounted of the upper surface of the power circuit substrate 30A as the substrate temperature $T_E$. On the bottom side of the power circuit substrate 30A, a relay circuit 71, a coil 72 for noise countermeasure, and electrolytic capacitors 73a and 73b for smoothing a power supply are arranged, through-holes 74 that pierce the power circuit substrate 30A are formed at the positions opposite to the undersides of the FET1 to FET6 respectively, and discoid copper coins 75 serving as heat conductive members are press-fitted into the through-holes 74 respectively. Since the thermistor 200 is connected to the undersides of the copper coins 75 touching the FET1 to FET6 through a heat conductive grease with insulation (not shown), it is possible to make heat resistances between the thermistor 200 and the FET1 to FET6 small and conduct heating temperatures of the FET1 to FET6 to the thermistor 200 with the low heat resistances, dispersion of the heat resistances between a plurality of FET1 to FET6 and the thermistor 200 becomes small, and it is possible to accurately measure the temperatures of the FET1 to FET6.

In FIG. 2, a motor current detector 38 detects a motor current Im of the motor 20. Since the motor 20 of the present embodiment is a three-phase motor, a U-phase motor current $i_u$, a V-phase motor current $i_v$ and a W-phase motor current $i_w$, which are motor currents of respective phases, are detected, and these motor currents of three phases are fed back as the motor current Im. The U-phase motor current $i_u$, the V-phase motor current $i_v$ and the W-phase motor current $i_w$ are inputted into a substrate calorific value calculating section 340, and at the same time, are inputted into coil calorific value calculating sections 310, 320 and 330 respectively.

The coil calorific value calculating sections 310, 320 and 330 respectively calculate calorific values (coil calorific values) $Q_U$, $Q_V$ and $Q_W$ of coils in respective phases. Though a calorific value can be obtained from an expression of electric power occurring in a resistance, a resistance of a coil (a coil resistance) in each phase is changed depending on the coil temperature in each phase. Therefore, the coil calorific values $Q_U$, $Q_V$ and $Q_W$ are calculated in accordance with the following expressions 1 to 3 by dealing with the coil resistance as a function of the coil temperature.

$$Q_U = R_U(T_U) \times i_u(t)^2 \quad \text{[Expression 1]}$$

$$Q_V = R_V(T_V) \times i_v(t)^2 \quad \text{[Expression 2]}$$

$$Q_W = R_W(T_W) \times i_w(t)^2 \quad \text{[Expression 3]}$$

Here, $R_U(T_U)$, $R_V(T_V)$ and $R_W(T_W)$ are the coil resistances of the U-phase, the V-phase and the W-phase respectively, and $T_U$, $T_V$ and $T_W$ are the coil temperatures of the U-phase, the V-phase and the W-phase respectively. The motor currents $i_u$, $i_v$ and $i_w$ are expressed as functions of time t.

Moreover, the coil resistances $R_U(T)$, $R_V(T)$ and $R_W(T)$ in the case that the coil temperature is T, can be calculated in accordance with the following expressions 4 to 6 when the coil resistances at a reference temperature $T_b$ are $R_{U0}$, $R_{V0}$ and $R_{W0}$ respectively.

$$R_U(T) = R_{U0} \times \{1 + \alpha_U \times (T - T_b)\} \quad \text{[Expression 4]}$$

$$R_V(T) = R_{V0} \times \{1 + \alpha_V \times (T - T_b)\} \quad \text{[Expression 5]}$$

$$R_W(T) = R_{W0} \times \{1 + \alpha_W \times (T - T_b)\} \quad \text{[Expression 6]}$$

Here, $\alpha_U$, $\alpha_V$ and $\alpha_W$ are temperature coefficients of the U-phase, the V-phase and the W-phase respectively, for example, become $4.4 \times 10^{-3}$ [1/° C.] when the coil is a copper, and may be finely adjusted by an experiment and so on.

The coil calorific values $Q_U$, $Q_V$ and $Q_W$ can be calculated in accordance with the following expressions 7 to 9 by substituting the expressions 4 to 6 for the expressions 1 to 3 respectively.

$$Q_U = R_{U0} \{1 + \alpha_U \times (T_U - T_b)\} \times i_u(t)^2 \quad \text{[Expression 7]}$$

$$Q_V = R_{V0} \{1 + \alpha_V \times (T_V - T_b)\} \times i_v(t)^2 \quad \text{[Expression 8]}$$

$$Q_W = R_{W0} \{1 + \alpha_W \times (T_W - T_b)\} \times i_w(t)^2 \quad \text{[Expression 9]}$$

The coil calorific value calculating sections 310, 320 and 330 calculate the coil calorific values $Q_U$, $Q_V$ and $Q_W$ by using the above expressions 7 to 9 respectively.

The substrate calorific value calculating section 340 also calculates a calorific value of the control substrate (a substrate calorific value) $Q_E$ from an expression of electric power occurring in a resistance, and it obtains a magnitude of a current needed for the calculation by the motor currents $i_u$, $i_v$ and $i_w$. A calorific equivalent resistance of the control substrate (a substrate resistance) is changed depending on a temperature (the substrate temperature $T_E$ in the case of the control substrate) as with the coil resistance. Further, since the control substrate has heating corresponding to standby power such as feeble heating of a semiconductor switching element and heating caused by operations of a microcomputer or other semiconductors without a current passing through the coil in a state where an ignition is turned on, it is necessary to consider it in the calculation of the calorific value. Consequently, the calorific value $Q_E$ of the control substrate is calculated in accordance with the following expression 10.

$$Q_E = R_E(T_E) \times (i_u(t)^2 + i_v(t)^2 + i_w(t)^2) + Q_{E0} \quad \text{[Expression 10]}$$

Here, $R_E(T_E)$ is the substrate resistance, and $Q_{E0}$ a calorific value corresponding to standby power. The substrate resistance $R_E(T)$ in the case that the substrate temperature is T is calculated in accordance with the following expression 11 when the substrate resistance at the reference temperature $T_b$ is $R_{E0}$ and a temperature coefficient of the control substrate is $\alpha_E$.

$$R_E(T) = R_{E0} \times \{1 + \alpha_E \times (T - T_b)\} \quad \text{[Expression 11]}$$

The substrate calorific values $Q_E$ can be calculated in accordance with the following expression 12 by substituting the expression 11 for the expression 10.

$$Q_E = R_{E0} \times \{1 + \alpha_E \times (T_E - T_b)\} \times (i_u(t)^2 + i_v(t)^2 + i_w(t)^2) + Q_{E0} \quad \text{[Expression 12]}$$

In a case where there is no influence of a calorific value corresponding to standby power, a case where the calorific value corresponding to standby power is negligibly minute, and so on, it is possible to delete the $Q_{E0}$ in the above expressions 10 and 12

The substrate calorific value calculating section 340 calculates the substrate calorific value $Q_E$ by using the above expression 12.

A coil temperature calculating section 350 calculates coil temperatures $T_U$, $T_V$ and $T_W$ in respective phases from the coil calorific values $Q_U$, $Q_V$ and $Q_W$, the substrate calorific value $Q_E$, and the substrate temperature $T_E$. Derivation of expressions to calculate them will be described.

Transfer functions from the coil calorific values $Q_U$, $Q_V$ and $Q_W$, the substrate calorific value $Q_E$ and an outside air temperature $T_0$ to the coil temperatures $T_U$, $T_V$ and $T_W$ in respective phases and the substrate temperature $T_E$ can be expressed by the following expressions 13 to 16.

$$T_U = G_{UU}(s)Q_U + G_{VU}(s)Q_V + G_{WU}(s)Q_W + G_{EU}(s)Q_E + G_{0U}(s)T_0 \quad \text{[Expression 13]}$$

$$T_V = G_{UV}(s)Q_U + G_{VV}(s)Q_V + G_{WV}(s)Q_W + G_{EV}(s)Q_E + G_{0V}(s)T_0 \quad \text{[Expression 14]}$$

$$T_W = G_{UW}(s)Q_U + G_{VW}(s)Q_V + G_{WW}(s)Q_W + G_{EW}(s)Q_E + G_{0W}(s)T_0 \quad \text{[Expression 15]}$$

$$T_E = G_{UE}(s)Q_U + G_{VE}(s)Q_V + G_{WE}(s)Q_W + G_{EE}(S)Q_E + G_{0E}(s)T_0 \quad \text{[Expression 16]}$$

Here, $G_{XY}(s)$ is a frequency characteristic (a calorific value frequency characteristic) from a calorific value $Q_X$ to a coil temperature $T_Y$ in a Y-phase (X and Y are any of U, V, W and E), $G_{OX}$ is a frequency characteristic (an outside air temperature frequency characteristic) from the outside air temperature $T_O$ to a coil temperature $T_X$ in a X-phase (X is any of U, V, W and E), and the control substrate is regarded as an E-phase to simplify the explanation. "s" is a Laplace operator. In the case that a relationship between a group of the calorific value and the outside air temperature and the temperature (the coil temperature or the substrate temperature) in each phase is approximately a linear combination, the above frequency characteristic is defined as a transfer function having a predetermined value.

The following expressions 17 to 19 are obtained by solving the above expression 16 for $T_O$, substituting the result for the above expressions 13 to 15, and arranging the substitution results (hereinafter, "(s)" is omitted to make the expression easy to see by simplification).

$$T_U = G_{UU}'Q_U + G_{VU}'Q_V + G_{WU}'Q_W + G_{EU}'Q_E + G_{TU}T_E \quad \text{[Expression 17]}$$

$$T_V = G_{UV}'Q_U + G_{VV}'Q_V + G_{WV}'Q_W + G_{EV}'Q_E + G_{TV}T_E \quad \text{[Expression 18]}$$

$$T_W = G_{UW}'Q_U + G_{VW}'Q_V + G_{WW}'Q_W + G_{EW}'Q_E + G_{TW}T_E \quad \text{[Expression 19]}$$

Here, $G_{TB} = G_{OB}/G_{OE}$, $G_{AB}' = G_{AB} - G_{TB}G_{AE}$, and $G_{EB}' = G_{EB} - G_{TB}G_{EE}$ (A and B are any of U, V and W).

Figure 7:
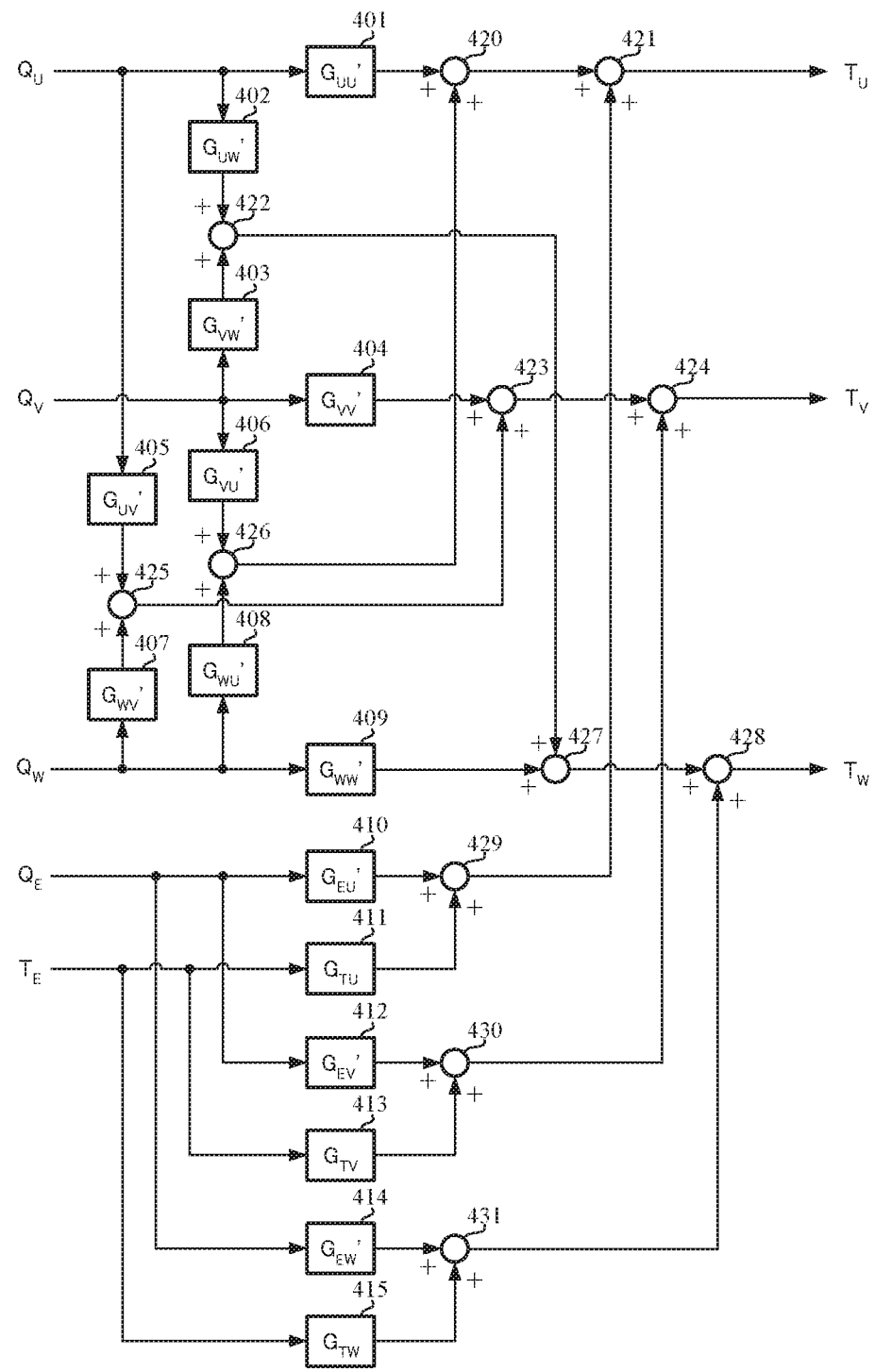
FIG. 7 is a block diagram showing a configuration example (the first embodiment) of a coil temperature calculating section.

FIG. 7 expresses the above expressions 17 to 19 with a block diagram. The coil temperature calculating section 350 calculates the coil temperatures $T_U$, $T_V$ and $T_W$ from the coil calorific values $Q_U$, $Q_V$ and $Q_W$, the substrate calorific value $Q_E$ and the substrate temperature $T_E$ in accordance with the configuration shown in FIG. 7. That is, the coil temperature calculating section 350 performs multiplications to the inputted coil calorific values $Q_U$ in the expressions 17 to 19 at calculating sections 401, 405 and 402, multiplications to the coil calorific values $Q_V$ in the expressions 17 to 19 at calculating sections 406, 404 and 403, multiplications to the coil calorific values $Q_W$ in the expressions 17 to 19 at calculating sections 408, 407 and 409, multiplications to the substrate calorific values $Q_E$ in the expressions 17 to 19 at calculating sections 410, 412 and 414, and multiplications to the substrate temperature $T_E$ in the expressions 17 to 19 at calculating sections 411, 413 and 415. To the results of the multiplications, the coil temperature calculating section 350 performs additions in the expression 17 at adding sections 420, 421, 426 and 429, additions in the expression 18 at adding sections 423, 424, 425 and 430, and additions in the expression 19 at adding sections 422, 427, 428 and 431. Outputs from the adding sections 421, 424 and 428 become the coil temperatures $T_U$, $T_V$ and $T_W$ respectively.

The coil temperatures $T_U$, $T_V$ and $T_W$ are inputted into an abnormality processing section 210, and at the same time, are retained in memories 360, 370 and 380 respectively to be used for the next calculation of the calorific value at the coil calorific value calculating sections 310, 320 and 330.

The abnormality processing section 210 performs, for example, processing at an abnormality judging section 25 and a motor current limiting section 23 described in a publication of Japanese Patent No. 4356295 B2. That is, as with the processing at the abnormality judging section 25, the abnormality processing section 210 judges whether the coil temperatures $T_U$, $T_V$ and $T_W$ exceed a preset tolerance limit temperature of the motor 20 or not, and judges that the motor 20 is overheated when they exceed it. When judging the overheating state, the abnormality processing section 210 gradually decreases the current command value with the elapse of time and gradually decreases the motor current with the elapse of time as with the processing at the motor current limiting section 23, or sets the current command value to zero and cuts off the motor current. It is possible to mount a temperature detecting circuit 31 and a temperature detecting section 26 described in the same publication and judge an abnormality of the temperature detecting circuit 31.

A coil temperature estimating section comprises the above coil calorific value calculating sections 310, 320 and 330, the substrate calorific value calculating section 340 and the coil temperature calculating section 350.

Figure 8:
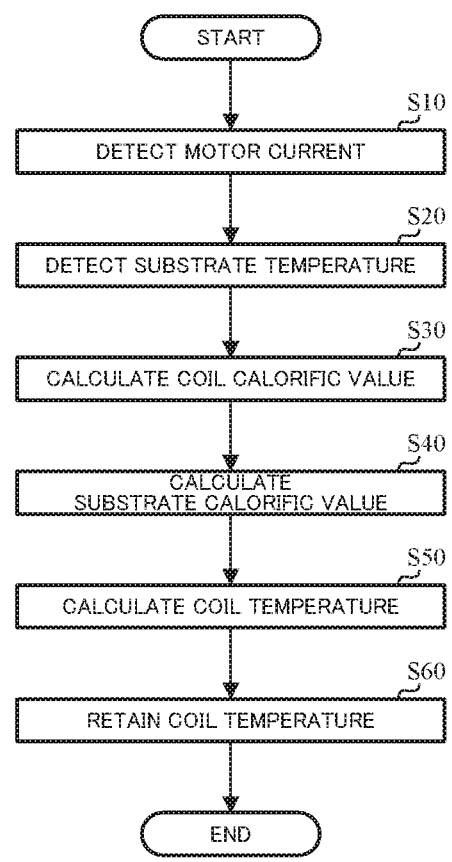
FIG. 8 is a flowchart showing an operating example (the first embodiment) of estimation of a coil temperature.

In such a configuration, an operating example of estimation of the coil temperature will be described with reference to a flowchart in FIG. 8.

The U-phase motor current $i_u$, the V-phase motor current $i_v$ and the W-phase motor current $i_w$ which are detected by the motor current detector 38 are inputted into the coil calorific value calculating sections 310, 320 and 330 respectively, and at the same time, are inputted into the substrate calorific value calculating section 340 (Step S10). The temperature sensor 200 detects the temperature of the control substrate (Step S20), and outputs the substrate temperature $T_E$ to the substrate calorific value calculating section 340 and the coil temperature calculating section 350. Moreover, the detection of the motor current and the detection of the substrate temperature may interchange in order, or may be performed in parallel.

The coil calorific value calculating sections 310 calculates the coil calorific value $Q_U$ in the U-phase by using the U-phase motor current $i_u$ and the previously estimated coil temperature $T_U'$ retained in the memory 360 in accordance with the expression 7. Similarly, the coil calorific value calculating sections 320 calculates the coil calorific value $Q_V$ in the V-phase by using the V-phase motor current $i_v$ and the coil temperature $T_V'$ retained in the memory 370 in accordance with the expression 8, and the coil calorific value calculating sections 330 calculates the coil calorific value $Q_W$ in the W-phase by using the W-phase motor current $i_w$ and the coil temperature $T_W'$ retained in the memory 380 in accordance with the expression 9 (Step S30). The reference temperature $T_b$, the coil resistances $R_{U0}$, $R_{V0}$ and $R_{W0}$ at the reference temperature $T_b$ and the temperature coefficients $\alpha_U$, $\alpha_V$ and $\alpha_W$ are preset.

The substrate calorific value calculating section 340 calculates the substrate calorific value $Q_E$ by using the inputted motor currents $i_u$, $i_v$ and $i_w$ and the substrate temperature $T_E$ in accordance with the expression 12 (Step S40). The reference temperature $T_b$, the substrate resistance $R_{E0}$ at the reference temperature $T_b$, the temperature coefficient $\alpha_E$ and the calorific value $Q_{E0}$ are preset.

The coil calorific values $Q_U$, $Q_V$ and $Q_W$ and the substrate calorific value $Q_E$ are inputted into the coil temperature calculating section 350 with the substrate temperature $T_E$. The coil temperature calculating section 350 calculates the coil temperatures $T_U$, $T_V$ and $T_W$ by the coil calorific values $Q_U$, $Q_V$ and $Q_W$, the substrate calorific value $Q_E$ and the substrate temperature $T_E$ on the basis of the expressions 17 to 19 (Step S50). The coil temperatures $T_U$, $T_V$ and $T_W$ are inputted into the abnormality processing section 210, and at the same time, are retained in the memories 360, 370 and 380 respectively (Step S60).

Moreover, it is possible to merge the coil calorific value calculating sections 310, 320 and 330, and calculate the coil calorific values $Q_U$, $Q_V$ and $Q_W$ in accordance with the expressions 7, 8 and 9. Further, memories 360, 370 and 380 may be also merged, or a shared memory may be used.

A second embodiment of the present invention will be described.

Though a whole configuration of the second embodiment is similar to one of the first embodiment, a configuration of the coil temperature calculating section is different.

The setting shown by the following expression 20 can be applied to the expressions 17 to 19 which the calculation at the coil temperature calculating section 350 of the first embodiment is based on because of symmetry of the phases.

$$G_{UU}'=G_{VV}'=G_{WW}'=G_L$$

$$G_{UV}'=G_{VU}'=G_{UW}'=G_{WU}'=G_{VW}'=G_{WV}'=G_M$$

$$G_{EU}'=G_{EV}'=G_{EW}'=G_E$$

$$G_{TU}=G_{TV}=G_{TW}=G_{TE} \qquad \text{[Expression 20]}$$

The following expressions 21 to 23 are obtained by substituting the above expression 20 for the expressions 17 to 19, and arranging the substitution results.

$$T_U=G_L Q_U+G_M(Q_V+Q_W)+G_E Q_E+G_{TE}T_E \qquad \text{[Expression 21]}$$

$$T_V=G_L Q_V+G_M(Q_W+Q_U)+G_E Q_E+G_{TE}T_E \qquad \text{[Expression 22]}$$

$$T_W=G_L Q_W+G_M(Q_U+Q_V)+G_E Q_E+G_{TE}T_E \qquad \text{[Expression 23]}$$

Figure 9:
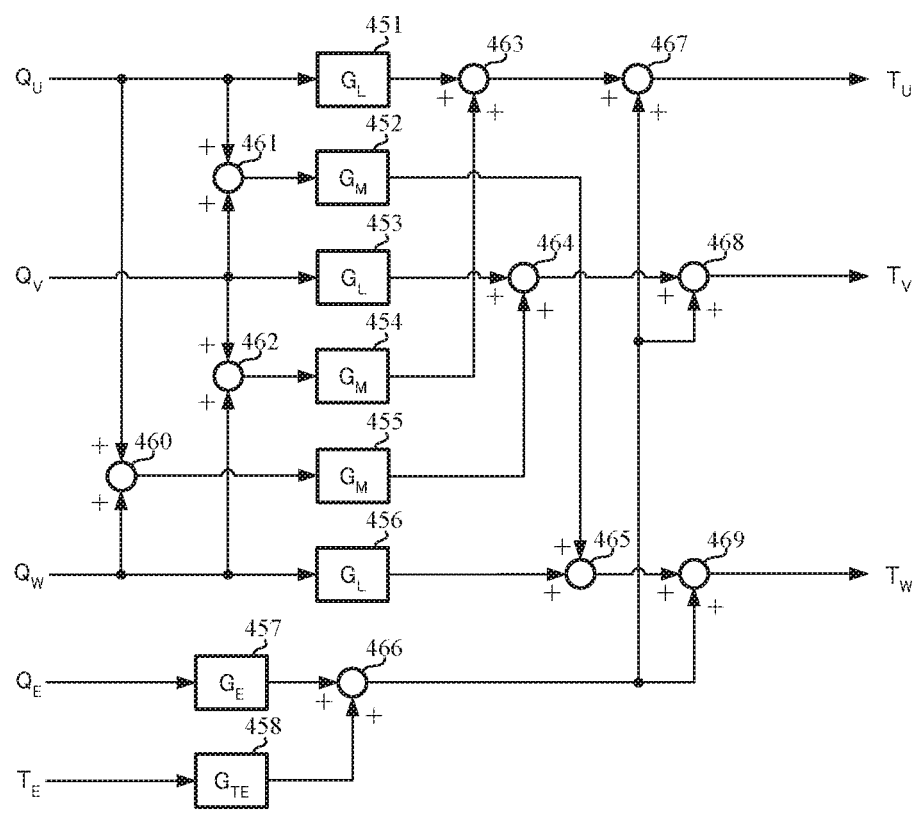
FIG. 9 is a block diagram showing a configuration example (a second embodiment) of a coil temperature calculating section.

FIG. 9 expresses the above expressions 21 to 23 with a block diagram, and the coil temperature calculating section of the second embodiment calculates the coil temperatures $T_U$, $T_V$ and $T_W$ from the coil calorific values $Q_U$, $Q_V$ and $Q_W$, the substrate calorific value $Q_E$ and the substrate temperature $T_E$ in accordance with the configuration shown in FIG. 9. That is, the coil temperature calculating section performs multiplications of $G_L$ to the coil calorific values $Q_U$, $Q_V$ and $Q_W$ at calculating sections 451, 453 and 456 respectively, additions shown in the parentheses of the expressions 21 to 23 at adding sections 462, 460 and 461 respectively, and multiplications of $G_M$ to the addition results at calculating sections 454, 455 and 452 respectively. Further, the coil temperature calculating section performs a multiplication of the third term and a multiplication of the fourth term which are common to the expressions 21 to 23 at calculating sections 457 and 458 respectively, and an addition of the multiplication results at an adding section 466. To the above-mentioned results, the coil temperature calculating section performs additions of the expression 21 at adding sections 463 and 467, additions of the expression 22 at adding sections 464 and 468, and additions of the expression 23 at adding sections 465 and 469. Outputs from the adding sections 467, 468 and 469 become the coil temperatures $T_U$, $T_V$ and $T_W$ respectively.

Comparing an operation of estimation of the coil temperature in the second embodiment with one in the first embodiment, the only above operation of the coil temperature calculating section is different, and other operations are the same.

In the above embodiments (the first embodiment and the second embodiment), though the coil temperature calculating section performs the calculations with the configuration shown in FIG. 7 or FIG. 9, it may performs them with a program in a CPU.

A third embodiment of the present invention will be described.

Figure 10:
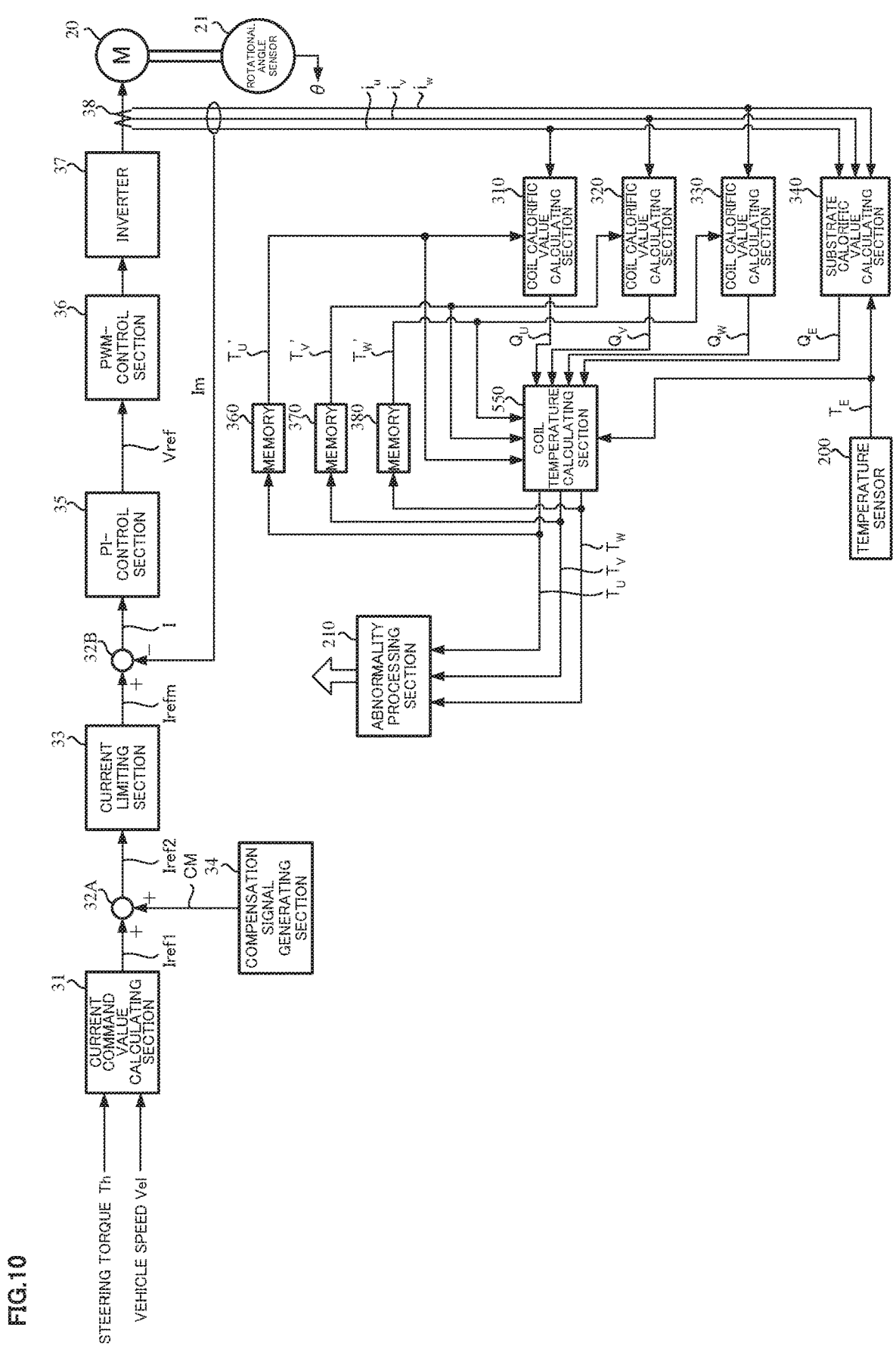
FIG. 10 is a block diagram showing a configuration example (a third embodiment) of the present invention.

A configuration example of the third embodiment is shown in FIG. 10. Compared with the configuration example of the first embodiment shown in FIG. 4, the coil temperature calculating section 350 is replaced with a coil temperature calculating section 550, and the coil temperatures $T_U'$, $T_V'$ and $T_W'$ retained in the memories 360, 370 and 380 are inputted into the coil temperature calculating section 550 in addition to the coil calorific values $Q_U$, $Q_V$ and $Q_W$, the substrate calorific value $Q_E$ and the substrate temperature $T_E$. The coil temperature estimating section comprises the coil calorific value calculating sections 310, 320 and 330, the substrate calorific value calculating section 340 and the coil temperature calculating section 550.

The coil temperature calculating section 550 calculates the coil temperatures $T_U$, $T_V$ and $T_W$ in respective phases on the basis of a differential equation of heat conduction.

The differential equations of heat conduction with respect to the coils in the U-phase, the V-phase and the W-phase are the following expressions 24, 25 and 26 respectively.

$$C_L \frac{dT_U}{dt} = Q_U - K_L(T_U - T_0) - \qquad \text{[Expression 24]}$$
$$K_{LL}(T_U - T_V) - K_{LL}(T_U - T_W) - K_{LE}(T_U - T_E)$$

$$C_L \frac{dT_V}{dt} = Q_V - K_L(T_V - T_0) - \qquad \text{[Expression 25]}$$
$$K_{LL}(T_V - T_W) - K_{LL}(T_V - T_U) - K_{LE}(T_V - T_E)$$

$$C_L \frac{dT_W}{dt} = Q_W - K_L(T_W - T_0) - \qquad \text{[Expression 26]}$$
$$K_{LL}(T_W - T_U) - K_{LL}(T_W - T_V) - K_{LE}(T_W - T_E)$$

Here, $C_L$ is a heat capacity of the coil, $K_L$ is a heat loss coefficient of the coil, $K_{LL}$ is a heat transfer coefficient between the coils, and $K_{LE}$ is a heat transfer coefficient between the coil and the control substrate. Difference information of the fifth term of the right side in each of the above expressions 24 to 26 expresses the heat conduction between each phase and the control substrate.

The differential equation of heat conduction with respect to the control substrate is the following expression 27.

$$C_E \frac{dT_E}{dt} = Q_E - K_E(T_E - T_0) - \qquad \text{[Expression 27]}$$
$$K_{LE}(T_E - T_U) - K_{LE}(T_E - T_V) - K_{LE}(T_E - T_W)$$

Here, $C_E$ is a heat capacity of the control substrate, and $K_E$ is a heat loss coefficient of the control substrate. Difference information from the third term to the fifth term of the right side in the above expression 27 expresses the heat conduction between each phase and the control substrate.

The following expressions 29 to 32 are obtained by arranging the above expression 24 to 27 and setting values as shown by the following expression 28.

[Expression 28]

$$\tau = \frac{C_L}{K_L + 2K_{LL} + K_{LE}}$$

$$\tau' = \frac{C_E}{K_E + 3K_{LE}}$$

$$\tau_{LL} = \frac{C_L}{K_{LL}}$$

$$\tau_{LE} = \frac{C_L}{K_{LE}}$$

$$\tau'_{LE} = \frac{C_E}{K_{LE}}$$

-continued $$\tau_L = \frac{C_L}{K_L}$$

$$\tau'_E = \frac{C_E}{K_E}$$

[Expression 29]

$$\frac{dT_U}{dt} = \frac{1}{C_L}Q_U - \frac{1}{\tau}T_U + \frac{1}{\tau_{LL}}T_V + \frac{1}{\tau_{LL}}T_W + \frac{1}{\tau_{LE}}T_E + \frac{1}{\tau_L}T_0$$

[Expression 30]

$$\frac{dT_V}{dt} = \frac{1}{C_L}Q_V - \frac{1}{\tau}T_V + \frac{1}{\tau_{LL}}T_W + \frac{1}{\tau_{LL}}T_U + \frac{1}{\tau_{LE}}T_E + \frac{1}{\tau_L}T_0$$

[Expression 31]

$$\frac{dT_W}{dt} = \frac{1}{C_L}Q_W - \frac{1}{\tau}T_W + \frac{1}{\tau_{LL}}T_U + \frac{1}{\tau_{LL}}T_V + \frac{1}{\tau_{LE}}T_E + \frac{1}{\tau_L}T_0$$

[Expression 32]

$$\frac{dT_E}{dt} = \frac{1}{C_E}Q_E + \frac{1}{\tau'_{LE}}T_U + \frac{1}{\tau'_{LE}}T_V + \frac{1}{\tau'_{LE}}T_W - \frac{1}{\tau'}T_E + \frac{1}{\tau'_E}T_0$$

The following expression 33 is obtained by transforming the above expression 32 and solving the transformation result for the outside air temperature $T_0$.

[Expression 33]

$$T_0 = \tau'_E \left\{ \frac{dT_E}{dt} - \frac{1}{\tau'_{LE}}(T_U + T_V + T_W) + \frac{1}{\tau'}T_E - \frac{1}{C_E}Q_E \right\}$$

Therefore, it is possible to obtain renewed coil temperatures $T_U$, $T_V$ and $T_W$ by obtaining the outside air temperature $T_0$ using the expression 33 by the substrate temperature $T_E$, the coil temperatures $T_U$, $T_V$ and $T_W$ and the substrate calorific value $Q_E$, obtaining differential values of the coil temperatures $T_U$, $T_V$ and $T_W$ using the expressions 29 to 31 by the outside air temperature $T_0$, the coil calorific values $Q_U$, $Q_V$ and $Q_W$, the coil temperatures $T_U$, $T_V$ and $T_W$ and the substrate temperature $T_E$, and integrating the differential values.

Figure 11:
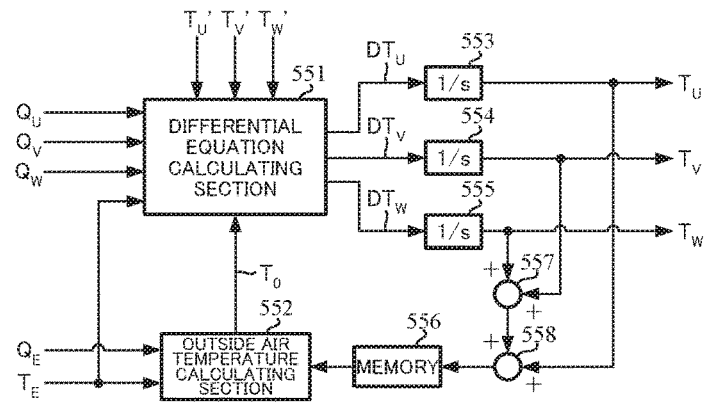
FIG. 11 is a block diagram showing a configuration example (the third embodiment) of a coil temperature calculating section.

The coil temperature calculating section 550 calculates the coil temperatures $T_U$, $T_V$ and $T_W$ in respective phases on the basis of the above expressions 29 to 31 and 33. A configuration example of the coil temperature calculating section 550 is shown in FIG. 11. The coil temperature calculating section 550 comprises a differential equation calculating section 551, an outside air temperature calculating section 552, integrating sections 553, 554 and 555, a memory 556, and adding sections 557 and 558. The differential equation calculating section 551 calculates differential values $DT_U$, $DT_V$ and $DT_W$ of the coil temperatures $T_U$, $T_V$ and $T_W$ using the expressions 29 to 31 by the coil calorific values $Q_U$, $Q_V$ and $Q_W$, the substrate temperature $T_E$, the previously estimated coil temperatures $T_U'$, $T_V'$ and $T_W'$ and the outside air temperature $T_0$ calculated at the outside air temperature calculating section 552. $C_L$, $\tau$, $\tau_{LL}$, $\tau_{LE}$ and $\tau_L$ in the expressions 29 to 31 are preset. The differential values $DT_U$, $DT_V$ and $DT_W$ are integrated at the integrating sections 553, 554 and 555 respectively, and the coil temperatures $T_U$, $T_V$ and $T_W$ are calculated. The integrals at the integrating sections 553, 554 and 555 are performed, for example, by accumulating the differential values to initial values of respective coil temperatures respectively. The coil temperatures $T_U$, $T_V$ and $T_W$ are outputted, at the same time, are added at the adding sections 557 and 558, and the addition result is retained in the memory 556. The outside air temperature calculating section 552 inputs the substrate calorific value $Q_E$ and the substrate temperature $T_E$ with the addition result $(T_U+T_V+T_W)$ retained in the memory 556, and calculates the outside air temperature $T_0$ using the expression 33. $C_E$, $\tau'$, $\tau_{LE}'$ and $\tau_E'$ in the expression 33 are preset.

The coil temperatures $T_U$, $T_V$ and $T_W$ calculated at the coil temperature calculating section 550 are inputted into the abnormality processing section 210, and at the same time, are retained in the memories 360, 370 and 380 respectively to be used in next calculations of the coil calorific values and next calculations of the coil temperatures.

Figure 12:
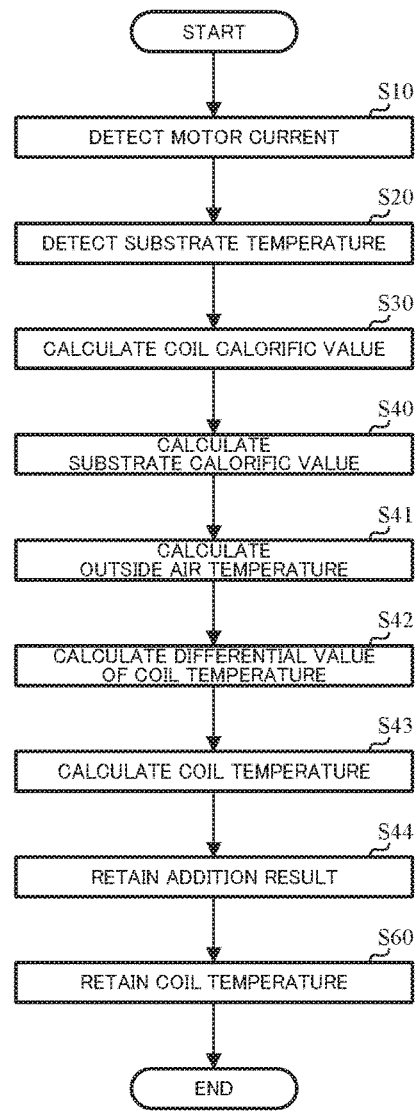
FIG. 12 is a flowchart showing an operating example (the third embodiment) of estimation of a coil temperature.

An operating example of estimation of the coil temperature in the third embodiment will be described with reference to a flowchart in FIG. 12.

The third embodiment performs the same operations as the first embodiment until calculating the substrate calorific value $Q_E$ (Steps S10 to S40).

The coil calorific values $Q_U$, $Q_V$ and $Q_W$ and the substrate calorific value $Q_E$ are inputted into the coil temperature calculating section 550.

The outside air temperature calculating section 552 in the coil temperature calculating section 550 inputs the addition result $(T_U+T_V+T_W)$ retained in the memory 556 with the calorific value $Q_E$ and the substrate temperature $T_E$, calculates the outside air temperature $T_0$ in accordance with the expression 33 (Step S41), and outputs it to the differential equation calculating section 551. The differential equation calculating section 551 calculates the differential values $DT_U$, $DT_V$ and $DT_W$ of the coil temperatures by the coil calorific values $Q_U$, $Q_V$ and $Q_W$, the substrate temperature $T_E$, the outside air temperature $T_0$ and the coil temperatures $T_U'$, $T_V'$ and $T_W'$ retained in the memories 360, 370 and 380 respectively in accordance with the expressions 29 to 31 (Step S42). The integrating sections 553, 554 and 555 input the differential values $DT_U$, $DT_V$ and $DT_W$ respectively, integrate them, and calculate the coil temperatures $T_U$, $T_V$ and $T_W$ (Step S43). The coil temperatures $T_U$, $T_V$ and $T_W$ are outputted, and at the same time, are added at the adding sections 557 and 558. The addition result $(T_U+T_V+T_W)$ is retained in the memory 556 for the next calculation of the outside air temperature (Step S44).

The coil temperatures $T_U$, $T_V$ and $T_W$ outputted from the coil temperature calculating section 550 are inputted into the abnormality processing section 210, and at the same time, are retained in the memories 360, 370 and 380 respectively (Step S60) Though the coil temperature calculating section 550 retains the addition result of the coil temperatures $T_U$, $T_V$ and $T_W$ in the memory 556, it is possible to use an addition result of the coil temperatures $T_U'$, $T_V'$ and $T_W'$ retained in the memories 360, 370 and 380 respectively when the outside air temperature calculating section 552 calculates the outside air temperature $T_0$. Further, though the coil temperature calculating section 550 calculates the coil temperature based on the differential equation, it is also possible to calculate it after transforming the differential equation into a difference equation that is generally used and is capable of being mounted in the ECU, or to calculate it after transforming the differential equation into a transfer function.

Though the above embodiments (the first to the third embodiments) target the three-phase motor, the present invention can be applied to a motor where the number of phases is other than three.

EXPLANATION OF REFERENCE NUMERALS 1 steering wheel
2 column shaft (steering shaft, handle shaft)

10 torque sensor
12 vehicle speed sensor
13 battery
20 motor
21 rotational angle sensor
30 control unit (ECU)
35 PI-control section
36 PWM-control section
37 inverter
38 motor current detector
200 temperature sensor
210 abnormality processing section
310, 320, 330 coil calorific value calculating section
340 substrate calorific value calculating section
350, 550 coil temperature calculating section
551 differential equation calculating section
552 outside air temperature calculating section

The invention claimed is:

1. An electric power steering apparatus that comprises a control substrate that controls a poly-phase motor, comprising:
    a temperature sensor that detects a substrate temperature of said control substrate; and
    a coil temperature estimating section that estimates coil temperatures of respective phases of said poly-phase motor by a motor current of said phase and said substrate temperature based on a heat transfer phenomenon between said respective phases that is caused by a difference in temperature between coils of said respective phases and a heat transfer phenomenon between said coil and said control substrate;
    wherein said coil temperature estimating section estimates said coil temperature by using at least a substrate calorific value of said control substrate obtained by said motor current and said substrate temperature.

2. The electric power steering apparatus according to claim 1,
    wherein said heat transfer phenomenon is expressed by a frequency characteristic.

3. The electric power steering apparatus according to claim 2,
    wherein said coil temperature estimating section comprises:
    a coil calorific value calculating section that obtains a coil calorific value of said phase by said motor current;
    a substrate calorific value calculating section that obtains said substrate calorific value; and
    a coil temperature calculating section that obtains said coil temperature by said coil calorific value, said substrate calorific value and said substrate temperature based on said frequency characteristic.

4. The electric power steering apparatus according to claim 3,
    wherein said coil calorific value calculating section changes a coil resistance of said phase used to obtain said coil calorific value, depending on said coil temperature of a corresponding phase; and
    wherein said substrate calorific value calculating section changes a substrate resistance used to obtain said substrate calorific value, depending on said substrate temperature.

5. The electric power steering apparatus according to claim 4,
    wherein said frequency characteristic includes a calorific value frequency characteristic that is a frequency characteristic from said coil calorific value or said substrate calorific value to said coil temperature or said substrate temperature, and an outside air temperature frequency characteristic that is a frequency characteristic from an outside air temperature to said coil temperature or said substrate temperature.

6. The electric power steering apparatus according to claim 5,
    wherein said coil temperature calculating section defines said calorific value frequency characteristic and said outside air temperature frequency characteristic as a transfer function, and obtains said coil temperature by a linear combination of said coil calorific value, said substrate calorific value and said substrate temperature.

7. The electric power steering apparatus according to claim 3,
    wherein said frequency characteristic includes a calorific value frequency characteristic that is a frequency characteristic from said coil calorific value or said substrate calorific value to said coil temperature or said substrate temperature, and an outside air temperature frequency characteristic that is a frequency characteristic from an outside air temperature to said coil temperature or said substrate temperature.

8. The electric power steering apparatus according to claim 7,
    wherein said coil temperature calculating section defines said calorific value frequency characteristic and said outside air temperature frequency characteristic as a transfer function, and obtains said coil temperature by a linear combination of said coil calorific value, said substrate calorific value and said substrate temperature.

9. The electric power steering apparatus according to claim 1,
    wherein said heat transfer phenomenon is expressed by a differential equation.

10. The electric power steering apparatus according to claim 9,
    wherein said coil temperature estimating section comprises:
    a coil calorific value calculating section that obtains a coil calorific value of said phase by said motor current;
    a substrate calorific value calculating section that obtains said substrate calorific value; and
    a coil temperature calculating section that obtains said coil temperature by said coil calorific value, said substrate calorific value and said substrate temperature based on said differential equation.

11. The electric power steering apparatus according to claim 10,
    wherein said coil calorific value calculating section changes a coil resistance of said phase used to obtain said coil calorific value, depending on said coil temperature of a corresponding phase; and
    wherein said substrate calorific value calculating section changes a substrate resistance used to obtain said substrate calorific value, depending on said substrate temperature.

12. The electric power steering apparatus according to claim 11,
    wherein said differential equation includes difference information between said coil temperature and said substrate temperature.

13. The electric power steering apparatus according to claim 10,
    wherein said differential equation includes difference information between said coil temperature and said substrate temperature.

14. The electric power steering apparatus according to claim 9,
wherein said differential equation includes difference information between said coil temperature and said substrate temperature.

\* \* \* \* \*